Aug. 29, 1950   G. W. BROWN ET AL   2,520,114
APPARATUS FOR APPLYING PROTECTIVE COVERINGS
Original Filed June 27, 1946   2 Sheets-Sheet 1

INVENTOR.
GROVER W. BROWN
VICTOR E. METZ
BY
James G. Bethell
ATTORNEY

Aug. 29, 1950     G. W. BROWN ET AL     2,520,114
APPARATUS FOR APPLYING PROTECTIVE COVERINGS
Original Filed June 27, 1946     2 Sheets-Sheet 2

INVENTOR.
GROVER W. BROWN
VICTOR E. METZ
BY
James G. Bethell
ATTORNEY

Patented Aug. 29, 1950

2,520,114

UNITED STATES PATENT OFFICE 2,520,114

APPARATUS FOR APPLYING PROTECTIVE COVERINGS

Grover W. Brown, Wyckoff, and Victor E. Metz, Rutherford, N. J., assignors to The Okonite Company, Passaic, N. J., a corporation of New Jersey Original application June 27, 1946, Serial No. 679,732. Divided and this application July 15, 1949, Serial No. 105,006

5 Claims. (Cl. 154—41)

Our invention relates to apparatus for applying a layer of rubber or rubber-like material to weatherstripping as a protective covering.

The weatherstripping to be covered is made in several steps. The first step is to weave a cloth web containing steel wire. The next step involves the extrusion and continuous cure of a round cylinder of sponge rubber or a rubber-like material along one edge of the cloth web so that the same is embedded in this cylindrical member. The cylindrical member or bead and the web are bonded to each other.

The next step is the application of an outer protective covering to this assembly, this covering being of rubber or rubber-like material. It is this step with which the present invention is concerned primarily.

Where the outer protective covering is in the nature of a film as distinguished from a cover of substantial thickness, it may be applied by the latex dip process. Where this protective covering is very heavy, say one-eighth inch in thickness, then it may be applied by extrusion.

Where the covering is to be intermediate these two thicknesses difficulty is encountered, this difficulty being overcome by the apparatus of the present invention.

Generally speaking, our invention provides an apparatus wherein a metal-backed tape-like strip of the unvulcanized covering material is folded about the weatherstripping including the webbing, the edges of the covering material being brought together at the outer edge of the webbing.

The assembly is then vulcanized and the metal backing removed leaving the weatherstripping completely covered with a vulcanized material.

In the accompanying drawings we have illustrated a machine embodying our invention.

Figure 5:
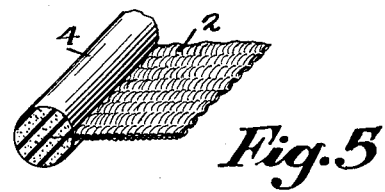
Fig. 5 is a fragmentary isometric view of the weatherstripping to be covered.

As above explained, the weatherstripping is first made up in the form shown in Fig. 5 of the drawings. A web of cloth 2 is first prepared, fine steel wire being woven into this fabric. A cylindrical bead 4 is then extruded about an edge of the web and vulcanized to bond the two together. This is conventional practice, and the covering material is to be applied to this assembly so as completely to cover the same.

In accordance with our invention we prepare a tape 6 of rubber or rubber-like material which is to constitute the covering material and back this tape with tin 8. This covering material at this stage is unvulcanized.

Figure 1:
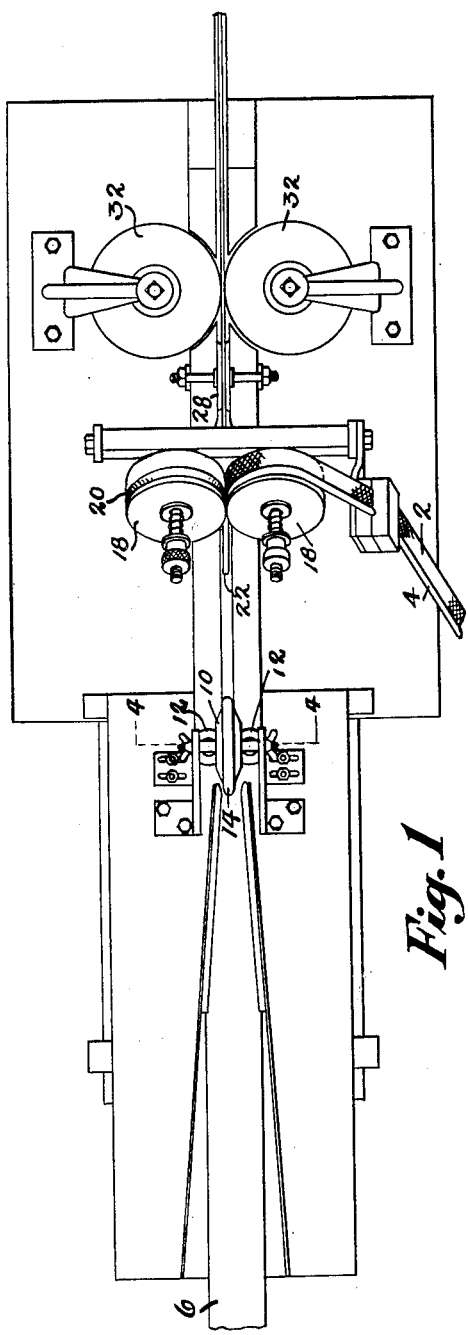
Fig. 1 is a plan view of the machine.
Figure 2:
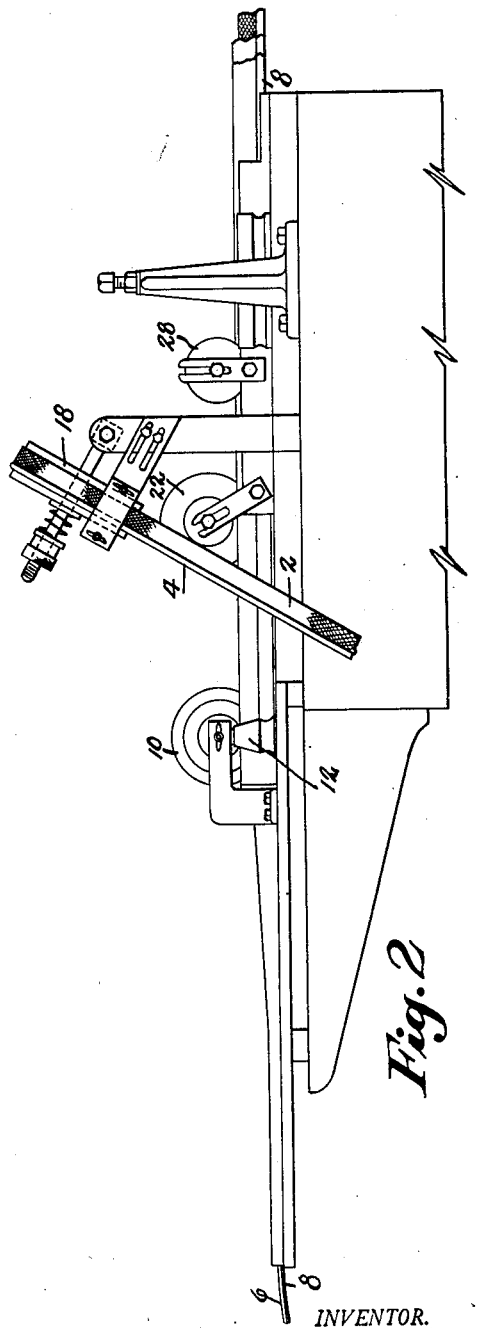
Fig. 2 is a side elevational view of the machine of Fig 1.
Figure 3:
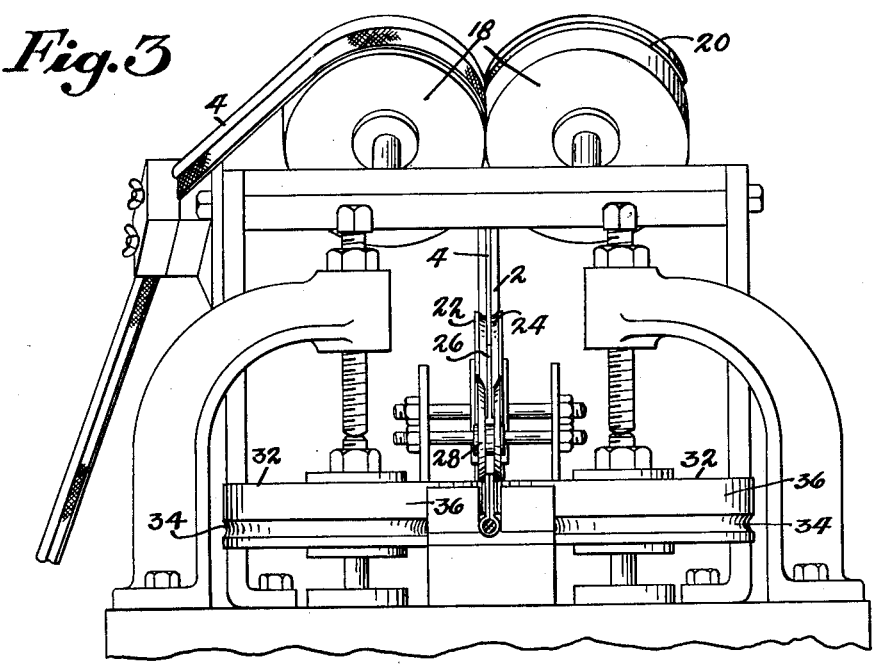
Fig. 3 is an end view of the machine of Fig. 1.
Figure 4:
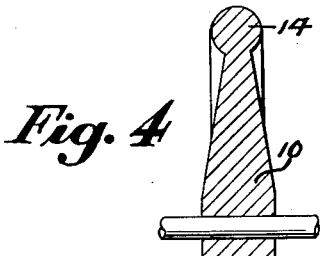
Fig. 4 is a section on the line 4—4 of Fig. 1.

The tin backed covering tape is fed between a forming roller 10 and a pair of conical side forming rollers 12. The periphery of the forming roller 10 is provided with a bead 14, and the side forming rollers 12 are provided with peripheral grooves 16 complementary to the bead 14, so that as the tin backed covering tape passes between the roller 10 and the side forming rollers it will be bent to the shape of the bead 4 of the weather-stripping. The side rollers 12 press the tin-backed covering tape against the inside roller 10 at the lowest point of revolution of roller 10, so that as the covering tape is dragged forward the inside forming roller 10 spreads the covering tape slightly as seen in Fig. 4. This facilitates forcing of the weatherstripping into place as will be brought out presently.

The weatherstripping to be covered is fed in from the side of the machine between a pair of rollers 18 having a peripheral groove 20 for the reception of the bead 4 of the weatherstripping. The weatherstripping passes downwardly about a roller 22 which is disposed in the path of the covering tape, the axis of this roller being transverse of the direction of travel of the tape. This roller is provided with a peripheral slot 26 for the reception of the webbing 2 of the weatherstripping.

Figure 6:
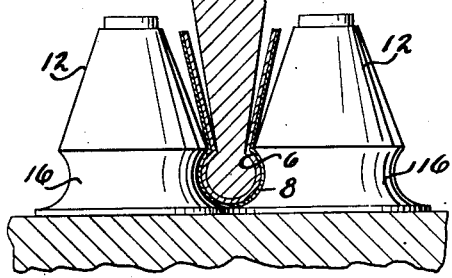
Fig. 6 is a fragmentary isometric view of the finished product.
Figure 6:
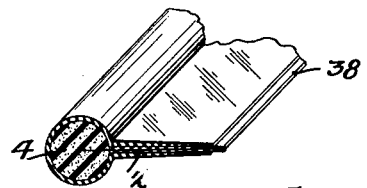

The periphery of roller 22, it will be appreciated, will force the weatherstripping downwardly between the two sides of the covering tape, the bead 4 bottoming on the covering tape. The covering tape and the weatherstripping then pass beneath and in contact with the periphery of roller 28. This roller has a grooved periphery and a peripheral slot which partially closes the sides of the covering tape upon the webbing 2, the final forming of the covering tape being accomplished by a pair of contour rollers 32 rotatable about axes disposed transverse to the tape and weather stripping and at 90° to the axes of rollers 22 and 28. These rollers 32 have a peripheral groove 34 and flat surface 36, by which the covering material is squeezed into intimate contact with the weatherstripping, these rollers also pinching the opposed sides of the covering material together just beyond the edge of the web 2 as shown at 38 in Fig. 6, so that the weatherstripping is completely covered from end to end.

The assembly is finally vulcanized by any conventional method and the tin backing removed.

It will be seen from all of the foregoing that we have provided an apparatus for covering weatherstripping whereby the same is completely covered, the apparatus being adapted for covering the weatherstripping in continuous lengths.

It will be seen from the drawings that the rollers 10, 12, 18, 22 and 28 are all adjustably mounted so that the machine is adapted to handle stripping of different sizes if desired.

It is to be understood that changes may be made in details of construction and arrangement of parts within the purview of our invention.

This application is a division of our co-pending application, Serial No. 679,732, filed June 27, 1946.

What we claim is:

1. A machine for applying a covering to weatherstripping which comprises a web and a continuous bead along one edge of the web, said machine comprising the combination of a support for the continuous advance of a strip of covering material, forming rollers in the path of the advancing covering material for bending the same laterally to the general contour of the weatherstripping, a pair of rollers above said support for continuously feeding the weatherstripping into contact with the preformed covering material after the weatherstripping passes said pair of rollers, and a pair of contour rollers following the last-mentioned rollers for pressing the covering strip into intimate contact with the weatherstripping and to bring the opposed surfaces of the covering strip into contact with each other beyond the outer edge of the weatherstripping web.

2. A machine for applying a covering to weatherstripping which comprises a web and a continuous bead along one edge of the web, said machine comprising the combination of a support for the continuous advance of a strip of covering material, a center roller and a roller at each side of the center roller in the path of the covering strip for continuously pre-forming the covering strip to the general contour of the weatherstripping, rollers for feeding the weatherstripping continuously into contact with the pre-formed traveling cover strip, the periphery of one of said rollers being grooved and slotted for the reception of the bead and web of the weatherstripping, another roller in the path of the partially assembled weatherstripping and covering strip, this last mentioned roller being provided with a peripheral groove and a peripheral slot for the reception of the bead, web and covering strip, and a pair of opposed rollers following the roller last mentioned for pressing the covering material into intimate contact with the weatherstripping and to press the opposed edge surfaces of the covering strip into contact with each other along the outer edge of the web of the weatherstripping.

3. A machine for applying a covering to weatherstripping which comprises a fabric web and a continuous bead of rubber extending along one edge of the web, said machine comprising in combination a support for a strip of covering material, a central roller and a roller at each side thereof for folding or forming the advancing covering material to the general contour of the weatherstripping, a roller for feeding the weatherstripping between the two sides of the covering strip, a roller following the last-mentioned roller provided with a peripheral groove and slit to receive the assembly of covering strip and weatherstripping, and a pair of finishing rollers for pressing the covering strip into intimate contact with the weatherstripping and to squeeze the two side surfaces of the covering strip into contact at the edge of the web of the weatherstripping.

4. A machine for applying a covering strip to weatherstripping which comprises a web and a continuous bead along one edge of the web, said machine comprising in combination a support for the continuous advance of a strip of covering material, a pair of bead forming rollers and an intermediate roller in the path of the advancing covering material for bending the covering material as it is being continuously advanced to form a two-ply web united along one edge by a bead, a pair of rollers above said support for continuously feeding the weatherstripping into contact with the shaped covering material, and a pair of rollers following the last-mentioned rollers for pressing the covering strip into intimate contact with the weatherstripping about the bead and the sides of the web thereof and to bring the opposed surfaces of the covering strip into contact with each other beyond the outer edge of the weatherstripping web.

5. A machine for applying a covering strip to weatherstripping which comprises a web and a continuous bead along one edge of the web, said machine comprising in combination a support for the continuous advance of a strip of covering material, a pair of opposed rollers and an intermediate cooperating roller in the path of the advancing covering material, the opposed rollers having grooved peripheries and rotating on axes normal to the direction of travel of the covering material, the intermediate roller rotating about an axis transverse to the direction of travel of the covering material and provided with a continuous peripheral bead cooperating with peripheral grooves in the said opposed rollers, whereby as the covering material is advanced it will be bent to provide a double walled web united along one edge by a hollow bead, a pair of advancing rollers above said support, a cooperating roller beneath the said advancing rollers and disposed in the path of the formed covering material, the said advancing rollers and said cooperating roller advancing the weatherstripping into contact with the covering material with the bead of the weatherstripping lying in the hollow bead of the covering material and the web of the weatherstripping lying between the two walls of the web of the covering material, and a pair of pressing rollers following the said advancing rollers for pressing the covering strip into intimate contact with the weatherstripping about the bead and the sides of the web thereof and to bring the opposed surfaces of the covering strip into contact with each other beyond the outer edge of the weatherstripping web.

GROVER W. BROWN.
VICTOR E. METZ.

REFERENCES CITED

The following references are of record in the file of this patent:

UNITED STATES PATENTS

| Number | Name | Date |
|---|---|---|
| 1,622,340 | Paeplow | Mar. 29, 1927 |
| 2,195,046 | Best | Mar. 26, 1940 |
| 2,358,142 | Carlin | Sept. 12, 1944 |